United States Patent
Ono et al.

(10) Patent No.: US 8,558,682 B2
(45) Date of Patent: Oct. 15, 2013

(54) DRIVER OPERATION PREDICTION DEVICE, METHOD, AND DRIVER OPERATION PREDICTION PROGRAM

(75) Inventors: Eiichi Ono, Toyota (JP); Shigeyuki Hosoe, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 301 days.

(21) Appl. No.: 13/063,668

(22) PCT Filed: Jan. 20, 2010

(86) PCT No.: PCT/JP2010/051065
§ 371 (c)(1),
(2), (4) Date: Jun. 14, 2011

(87) PCT Pub. No.: WO2010/084994
PCT Pub. Date: Jul. 29, 2010

(65) Prior Publication Data
US 2011/0241863 A1 Oct. 6, 2011

(30) Foreign Application Priority Data
Jan. 20, 2009 (JP) ................................. 2009-009863

(51) Int. Cl.
*B60R 25/10* (2013.01)
(52) U.S. Cl.
USPC .......................................... 340/439; 340/435
(58) Field of Classification Search
USPC .......... 340/439, 435; 701/70, 41, 42; 303/146
See application file for complete search history.

(56) References Cited

U.S. PATENT DOCUMENTS

| 2004/0150514 A1 | 8/2004 | Newman et al. |
| 2005/0275284 A1 | 12/2005 | Katayama |
| 2007/0069872 A1 | 3/2007 | Arakawa et al. |
| 2009/0069994 A1 | 3/2009 | Uechi et al. |
| 2010/0168998 A1* | 7/2010 | Matsunaga .................. 701/200 |

FOREIGN PATENT DOCUMENTS

| EP | 1 600 321 A1 | 11/2005 |
| JP | A-2005-335588 | 12/2005 |
| JP | A-2006-59765 | 3/2006 |
| WO | WO 2008/015551 A2 | 2/2008 |

OTHER PUBLICATIONS

Fujioka, "Theoretical research on the stability of the closed system composed of a look-ahead driver and a planner vehicle," Society of Automotive Engineers of Japan, 2007, pp. 29-34 (with Abstract).

(Continued)

*Primary Examiner* — Shirley Lu
(74) *Attorney, Agent, or Firm* — Oliff & Berridge, PLC

(57) ABSTRACT

A deviation angle, between a progression direction of a vehicle and a direction of a target destination point after a predetermined forward gaze duration on a target course the vehicle is travelling on, is detected by target destination point deviation angle detection unit. A yaw angular speed proportional to the deviation angle detected by the target destination point deviation angle detection unit is predicted by yaw angular speed prediction unit, as a yaw angular speed realized by steering wheel operation by a driver after a predetermined lag time for matching a timing of change in the vehicle movement with a timing of change in curvature of the target course. By so doing, the yaw angular speed due to steering wheel operation by a driver can be predicted with good precision.

18 Claims, 6 Drawing Sheets

(56) References Cited

OTHER PUBLICATIONS

International Search Report mailed May 11, 2010 issued in International Patent Application No. PCT/JP2010/051065.

Written Opinion of the International Searching Authority mailed May 11, 2010 issued in International Patent Application No. PCT/JP2010/051065.

* cited by examiner

DRIVER OPERATION PREDICTION DEVICE, METHOD, AND DRIVER OPERATION PREDICTION PROGRAM

TECHNICAL FIELD

The present invention relates to a driver operation prediction device, method, and a driver operation prediction program, and in particular to a driver operation prediction device and method that predict yaw angular speed realized by driver operation of a steering wheel, and to a program of the same.

BACKGROUND ART

Conventionally, driver models are known that estimate the operation amount by a driver who has been given a target course. For example, driver models are known that feedback the deviation in vehicle predicted position, if a vehicle was to progress as it is in the current vehicle orientation, from a forward gaze point on a target course, and feedback the deviation between yaw angel displacement and a target yaw angle, for computing a steering angle as an operation amount in Japanese Patent Application Laid-Open (JP-A) No. 2005-335588. In such driver models the yaw angle at the forward gaze point, namely, the tangential direction of a target course at the forward gaze point, is detected in order to compute the operation amount.

Furthermore, a driving behavior model is known that is formed with feed forward control of a condition amount relating to road profile, and feedback control relating to a deviation amount of a course from the vehicle movement in JP-A No. 2006-059765. In this driving behavior model a yaw angle differential value of a center line, or the like, is used as the condition amount relating to road profile.

However, in the technology described in JP-A No. 2005-335588, when the driver model is installed to a vehicle and the tangential direction of a target course at the forward gaze point is estimated from image data in a forward direction, there is the problem that the operation amount of a driver cannot be derived with good precision since there is noise contained in the obtained data.

Furthermore, in the technology described in JP-A No. 2006-059765, the driver model is installed to a vehicle, and when the yaw angle derivative value of the center line is estimated from the image data in a forward direction, there is the problem that the operation amount of a driver cannot be derived with good precision since there is noise contained in the obtained data.

SUMMARY OF INVENTION

The present invention is made in order to solve the above problems, and an objective thereof is to provide a driver operation prediction device that can predict the yaw angular speed due to steering wheel operation by a driver with good precision, and to provide a program of the same.

In order to achieve the above objective, the driver operation prediction device according to the present invention is configured including: a target destination point deviation angle detection unit that detects a deviation angle between a progression direction of a vehicle, and a direction of a target destination point after a predetermined forward gaze duration on a target course being travelled by the vehicle; and a yaw angular speed prediction unit that predicts a yaw angular speed proportional to the deviation angle detected by the target destination point deviation angle detection unit, as a yaw angular speed realized by steering wheel operation by a driver after a predetermined lag time for matching a timing of change in vehicle movement to a timing of change in curvature of the target course.

The program according to the present invention is a program that causes a computer to function as: a target destination point deviation angle detection unit that detects a deviation angle between a progression direction of a vehicle, and a direction of a target destination point after a predetermined forward gaze duration on a target course being travelled by the vehicle; and a yaw angular speed prediction unit that predicts a yaw angular speed proportional to the deviation angle detected by the target destination point deviation angle detection unit, as a yaw angular speed realized by steering wheel operation by a driver after a predetermined lag time for matching a timing of change in vehicle movement to a timing of change in curvature of the target course.

According to the present invention, the deviation angle between the progression direction of a vehicle, and the direction of a target destination point after the predetermined forward gaze duration on a target course being travelled by the vehicle is detected by the target destination point deviation angle detection unit. A yaw angular speed, proportional to the deviation angle detected by the target destination point deviation angle detection unit, is predicted by the yaw angular speed prediction unit, as the yaw angular speed realized by steering wheel operation by a driver after a predetermined lag time for matching the timing of change in vehicle movement to the timing of change in curvature of the target course.

In this manner, the yaw angular speed due to steering wheel operation by the driver can be predicted with high precision by delaying the yaw angular speed proportional to the deviation angle to the direction of the target destination point by the lag time, and predicting the yaw angular speed realized by operation of the steering wheel.

The value of the ratio of the above forward gaze duration to the lag time may be between 2.6 and 4.4. A proportionality coefficient of the yaw angular speed to the deviation angle can be determined such that the product of the proportionality coefficient and the forward gaze duration is a value between 1.9 and 2.2. By so doing, the yaw angular speed due to steering wheel operation by the driver can be predicted with higher precision.

The driver operation prediction device according to the present invention can further include: a yaw angular speed detection unit that detects the yaw angular speed of the vehicle; and a warning control unit that controls such that a warning is output by an output device when an absolute value of a deviation between the yaw angular speed predicted by the yaw angular speed prediction unit and the yaw angular speed detected after the lag time by the yaw angular speed detection unit is a specific value or greater. By so doing, a warning is output when the deviation to the predicted yaw angular speed is great, and accidents can be prevented from occurring.

As explained above, according to the driver operation prediction device and the program of the present invention the effect is obtained that the yaw angular speed due to steering wheel operation by the driver can be predicted with high precision, by delaying the yaw angular speed proportional to the deviation angle to the direction of the target destination point by the lag time, and predicting the yaw angular speed realized by operation of the steering wheel.

MODES FOR CARRYING OUT THE INVENTION

Explanation will now be given of details of an exemplary embodiment of the present invention, with reference to the drawings. The present exemplary embodiment, explanation will be given of an example of application of the present invention of a driver warning device installed to a vehicle, and outputting a warning to a driver.

Figure 1:
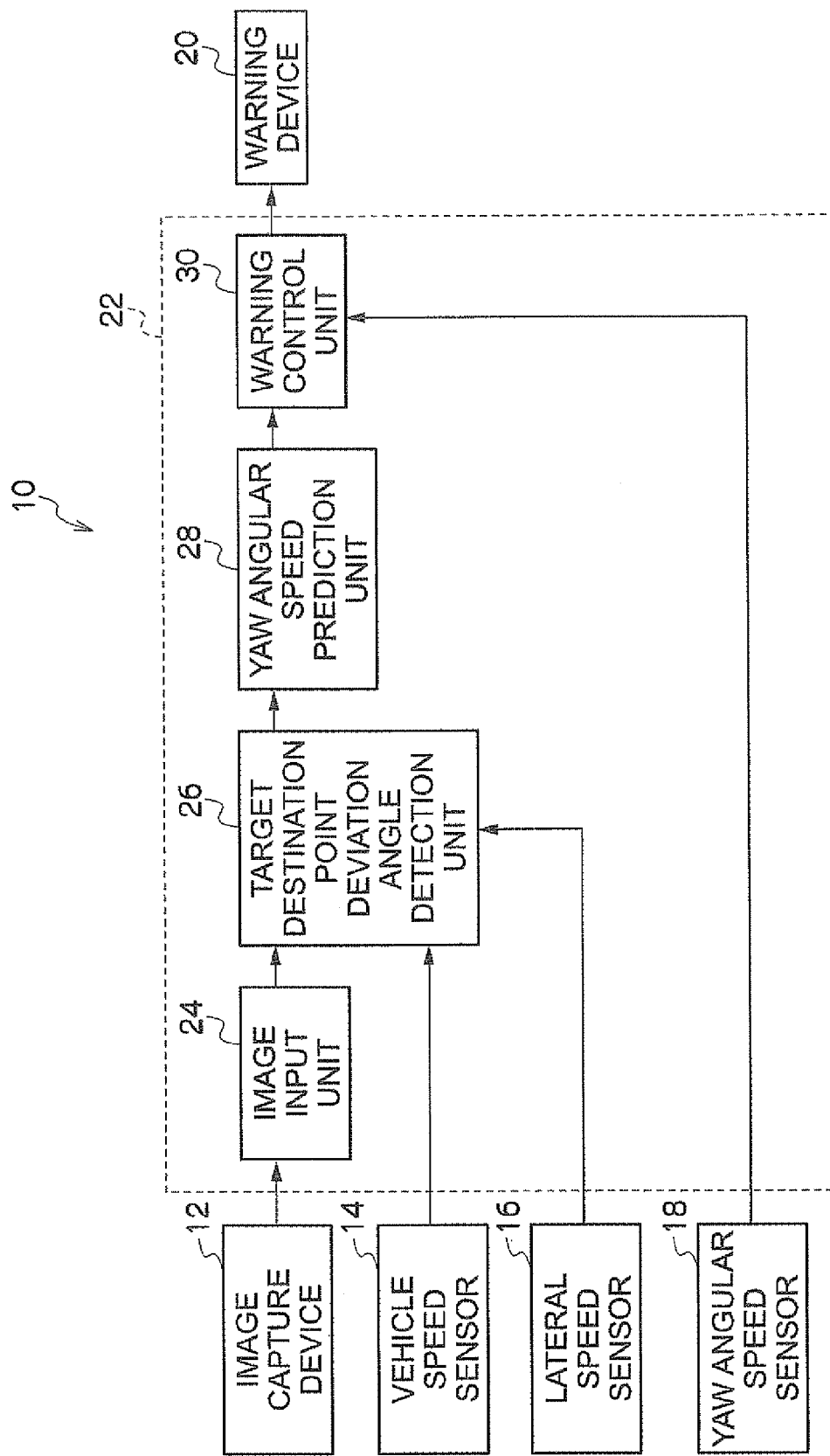
FIG. 1 is schematic diagram showing a configuration of a driver warning device according to an exemplary embodiment of the present invention.

As shown in FIG. 1, a driver warning device 10 according to an exemplary embodiment of the present invention is equipped with: an image capture device 12 that captures images in the forward direction of a vehicle; a vehicle speed sensor 14 that detects the speed of a vehicle; a lateral speed sensor 16 that detects the lateral speed of a vehicle; a yaw angular speed sensor 18 that detects the yaw angular speed of a vehicle; a warning device 20 that outputs a warning to a driver of a vehicle; and a computer 22 that controls the warning device 20 based on the respective outputs from the vehicle speed sensor 14, the lateral speed sensor 16 and the yaw angular speed sensor 18, and based on a forward direction image captured by the image capture device 12.

The image capture device 12 is equipped with: an image capture section (not shown in the drawings) that captures images in a forward direction of a vehicle and is configured by a monocular camera that generates an image signal of an image; a A/D converter (not shown in the drawings) that A/D converts the image signal generated by the image capture section; and an image memory (not shown in the drawings) for temporarily storing the A/D converted image signal.

The warning device 20 is equipped with a speaker, and outputs an audible warning to a driver according to control by the computer 22.

The computer 22 is equipped with a CPU, a RAM, and a ROM stored with a program for executing a warning control processing routine, described later, and is functionally configured as follows. The computer 22 is equipped with: image input unit 24 that acquires the forward direction image output from the image capture device 12; target destination point deviation angle detection unit 26 that, from a forward image, detects a predicted destination position after a forward gaze duration in the progress direction of a vehicle and, from the forward image, detects a target destination point after the forward gaze duration on a target course on which the vehicle is travelling, and detects the deviation angle between the progression direction of the vehicle and the direction of the target destination point after the forward gaze duration; yaw angular speed prediction unit 28 that predicts the yaw angular speed realized by steering wheel operation by a driver after a lag time, described later, based on the angle of deviation between the progression direction of the vehicle and the direction of the target destination point after the forward gaze duration; and warning control unit 30 that controls the output of a warning by the warning device 20 according to the absolute value of the deviation between the predicted yaw angular speed and the yaw angular speed detected by the yaw angular speed sensor 18.

The target destination point deviation angle detection unit 26 computes a slip angle, based on the vehicle speed detected by the vehicle speed sensor 14 and the lateral speed detected by the lateral speed sensor 16. The target destination point deviation angle detection unit 26 computes the progression direction of the vehicle on the forward direction image, based on a previously derived vehicle longitudinal direction on the forward direction image and on the computed the slip angle. The target destination point deviation angle detection unit 26 detects, as a predicted destination position after the forward gaze duration, the point that is the forward gaze distance forward on the progression direction of the vehicle on the forward direction image, obtained by multiplying a pre-set forward gaze duration by the vehicle speed. Note that the slip angle may employ a value that has been computed based on a vehicle movement model from the vehicle speed and the steering wheel angle. Employing a lateral speed sensor becomes unnecessary in such cases.

The target destination point deviation angle detection unit 26 recognizes the target course from the forward direction image by image recognition processing, and detects, as a target destination position after the forward gaze duration, the point in the forward direction image that is on the target course and is the forward gaze distance forward, obtained by multiplying the pre-set forward gaze duration by the vehicle speed. The target destination point deviation angle detection unit 26 also detects the angle of deviation between the progression direction of the vehicle and the direction of the target destination point after the forward gaze duration, based on the predicted destination position after the forward gaze duration and the target destination point that have been detected in the forward direction image. Note that with regard to the target destination point, the target course of the vehicle may be acquired from a navigation system or the like, so as to detect the position of the target destination point. Furthermore, while explanation is given of an example of computing the slip angle by employing the vehicle speed sensor and lateral speed sensor there is no limitation thereto, and the slip angle may be derived by employing any known conventional method.

Explanation will now be given of the principle for predicting the yaw angular speed realized by steering wheel operation by a driver after a lag time.

Explanation will first be given of the principles of course following. The vehicle speed u here is taken as being constant, and the yaw angular speed r required for course following changes in proportion to time t according to Equation (1) shown below.

[Formula 1]

$$r(t) = a = b \cdot t \qquad (1)$$

Herein, a and b are constants determined according to the change in curvature of the course.

Figure 2:
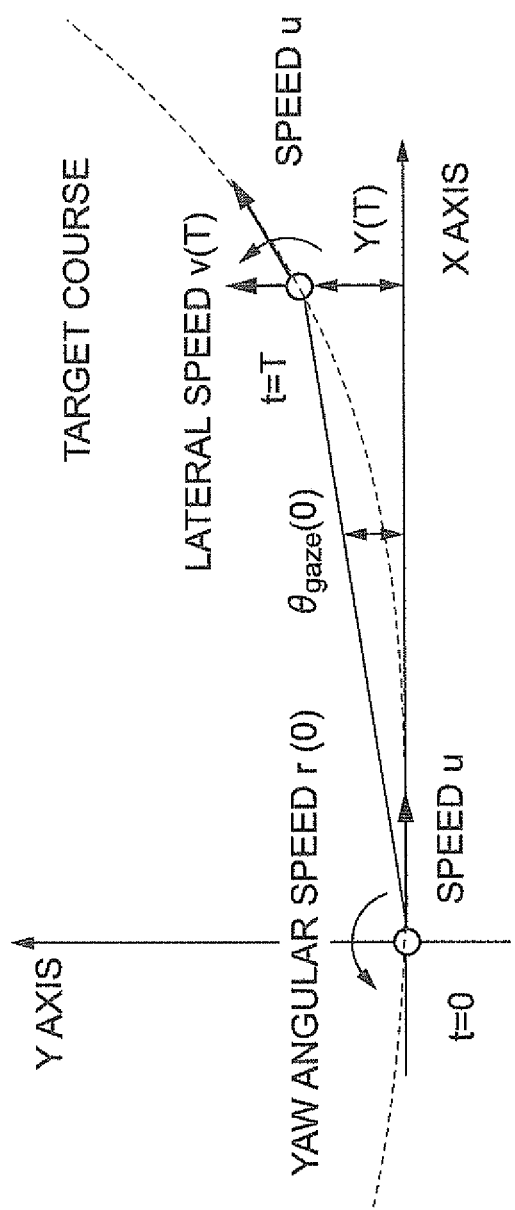
FIG. 2 is an image showing a deviation angle between the progression direction of a vehicle and the direction of a target destination point.

As shown in Equation 1, in the present exemplary embodiment, explanation will be given under the assumption of a course in which the curvature changes as a linear function of time. Furthermore, as shown in FIG. 2, the X axis direction is defined as the vehicle speed direction at time t=0, the Y axis direction is defined as a direction perpendicular to the X axis. Then the speed v (t) in the Y axis direction of a vehicle accurately following the course is as shown in Equation (2) below, wherein v (0)=0.

[Formula 2]

$$v(t) = \int r(t) \cdot u \, dt = (a \cdot t + \tfrac{1}{2} b \cdot t^2) \cdot u \qquad (2)$$

Furthermore, the lateral position y (t) on the course is computed by Equation (3) below.

[Formula 3]

$$y(t) = \int v(t) \cdot dt = (\tfrac{1}{2}a \cdot t^2 + \tfrac{1}{6}b \cdot t^3) \cdot u \tag{3}$$

Furthermore, under the assumption that the lateral position y (T) after a predetermined forward gaze duration T is sufficiently small in comparison to the movement distance uT, the direction $\theta_{gaze}$ of the target destination point position (forward gaze point) after the forward gaze duration T from time t=0 relative to the progression direction, approximates to Equation (4) below.

[Formula 4]

$$\theta_{gaze}(0) \cong \frac{y(T)}{uT} = \frac{1}{2}a \cdot T + \frac{1}{6}b \cdot T^2 \tag{4}$$

Explanation will now be given of a driver model that predicts vehicle movement realized by steering wheel operation by a driver.

It is considered possible to model driver operation, even just from feedback of the amount of deviation, or the angle of deviation, after a specific period of time of the vehicle destination point from a target course, obtained from forward direction image data. However, when gain is set to obtain sufficient following ability, a problem arises that sudden changes in curvature cannot be accommodated, and large following deviation occurs at points where the curvature changes. This following deviation occurs because "the deviation angle in the forward direction, being the feedback amount, changes before the actual change in curvature, and when a yaw angular speed according to the deviation angle in the forward direction is output, the turning conditions start before the actual change in curvature".

To address this, in the present exemplary embodiment, the point has been noticed that optimization can be made by delaying the timing of driver operation according to the forward gaze duration used for deriving the deviation angle in the forward direction, namely, adding in a lag time. Then, as will be explained below, the yaw angular speed, realized when steering wheel operation by a driver is performed to follow a target course, is predicted with good precision from just the feedback of the deviation angle in the forward direction.

The predicted value $r_{pre}$ of the yaw angular speed is computed, as a vehicle movement prediction value realized by steering wheel operation by a driver, according to Equation (5) below, from the deviation angle $\theta_{gaze}$ between the progression direction of a vehicle (speed vector direction) and the direction of a target destination point of the vehicle after the forward gaze duration T.

[Formula 5]

$$r_{pre}(t+\tau) = k \cdot \theta_{gaze}(t) \tag{5}$$

Herein, k is the gain as a proportionality coefficient, $\tau$ is the lag time. The lag time $\tau$ here is a period of time for matching a timing of change in the vehicle movement with a timing of change in curvature of the running course, and is a predetermined duration.

By substituting time t=0 into the above Equation (5), and then substituting the relationship of above Equation (4), Equation (6) below is obtained.

[Formula 6]

$$r_{pre}(\tau) = k \cdot (\tfrac{1}{2}a \cdot T + \tfrac{1}{6}b \cdot T^2) \tag{6}$$

Equation (7) below must also hold, because the yaw angular speed of Equation (1) must be output in order to follow the target course.

[Formula 7]

$$r_{pre}(\tau) = r(\tau) = a + b \cdot \tau \tag{7}$$

Equation (8) is obtained from Equation (6) and Equation (7) above.

[Formula 8]

$$\frac{1}{k} \cdot (a + b \cdot \tau) = \frac{1}{2}a \cdot T + \frac{1}{6}b \cdot T^2 \tag{8}$$

The conditions for above Equation (8) to hold for any given values of a and b are shown by Equation (9) and Equation (10) below.

[Formula 9]

$$k \cdot T = 2 \tag{9}$$

$$k \cdot T^2 = 6\tau \tag{10}$$

By substituting Equation (9) above into Equation (10) reduction may be made to Equation (11) below.

[Formula 10]

$$T = 3\tau \tag{11}$$

Namely, if Equation (9) and Equation (11) hold, the yaw angular speed prediction value computed in Equation (5) matches the yaw angular speed for course following of Equation (1), and course following is realized.

However, b=0 hold at the time of turning in a circular arc since in this case the yaw angular speed takes a constant value. In this case, Equation (11) becomes unnecessary and so the lag time may be 0. Therefore, the lag time can be viewed as a parameter for applying when the yaw angular speed changes, namely, the curvature of the target course changes.

Furthermore, explanation has been given above of a case where the yaw angular speed prediction value is matched with the yaw angular speed for course following at time t=0. However, since explanation can be made with the same principle as when time t=0 for any given time by re-defining the coordinate system, the conditions of Equation (9) and Equation (11) above can be derived in a similar manner.

Based on the principle explained above, the yaw angular speed prediction unit 28 of the driver warning device 10 according to the present exemplary embodiment employs the lag time T set, as shown in Equation (11) above, to be one third the forward gaze duration T (so that the forward gaze duration becomes 3 times the lag time $\tau$), and employs the gain k set such that, as shown in Equation (9) above, the product thereof with the forward gaze duration T becomes 2. The yaw angular speed realized by steering wheel operation by a driver after the lag time is then predicted according to Equation (6) above.

Explanation will now be given of the permissible ranges of parameters here. The permissible range of parameters is derived as follows.

Figure 3:
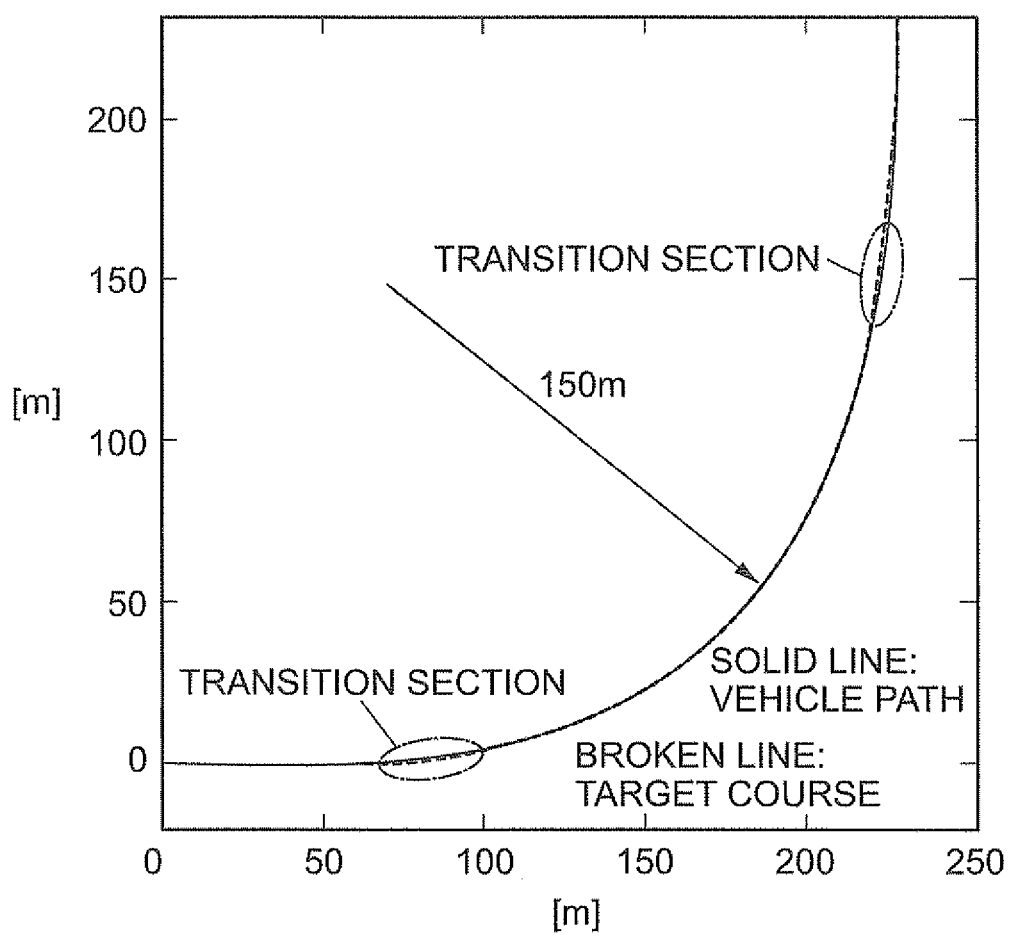
FIG. 3 is a graph showing the target course and the vehicle path computed from the yaw angular speed prediction values.

First, when travelling at 100 km/h on given target course of a straight line, a circular arc (radius 150 m) and transition sections (27.8 m), the vehicle path computed from the driver model output for proposal by the present invention, namely, the yaw angular speed predicted values is derived, and then the deviation from the target course is computed (see FIG. 3).

Then, the permissible range of parameters are derived by considering as parameters the ratio of the forward gaze duration to the lag time, and the product of the gain for computing the yaw angular speed with the forward gaze duration. Note that as a standard for the driver model the ratio of the forward gaze duration to the lag time is set to 3, and the product of the gain for computing the yaw angular speed with the forward gaze duration is set to 2. The permissible ranges of the parameters are ranges such that the maximum value of the course following deviation when the parameter changes is up to twice the maximum value of the course following deviation in this standard state.

Table 1 shows the parameter permissible ranges when the forward gaze duration is 1, 1.5, and 2 (s), in Table 1 below.

TABLE 1

| | Forward Gaze Duration | | |
|---|---|---|---|
| | 1 (s) | 1.5 (s) | 2 (s) |
| Forward Gaze Duration/Lag time | 2.6 to 4.3 | 2.6 to 4.3 | 2.6 to 4.4 |
| Gain × Forward Gaze Duration | 1.94 to 2.15 | 1.93 to 2.16 | 1.92 to 2.19 |

It can be seen that, whatever the forward gaze duration, the range in which the maximum value of the course following deviation when the parameter changes is up to twice the maximum value of the course following deviation in the standard state, are ranges for which the ratio of the forward gaze duration to the lag time is 2.6 to 4.4, and for which the product of the gain for computing the yaw angular speed with the forward gaze duration is 1.9 to 2.2.

Furthermore, when the turning radius of the target course is changed to 300 m, then the parameter permissible ranges are shown in Table 2 below.

TABLE 2

| | Forward Gaze Duration | | |
|---|---|---|---|
| | 1 (s) | 1.5 (s) | 2 (s) |
| Forward Gaze Duration/Lag time | 2.6 to 4.3 | 2.6 to 4.3 | 2.6 to 4.4 |
| Gain × Forward Gaze Duration | 1.91 to 2.19 | 1.91 to 2.19 | 1.90 to 2.20 |

It can be seen from Table 2 above that the parameter permissible ranges derived here also do not depend on the turning range of the course.

Consequently, in the yaw angular speed prediction unit 28 of the driver warning device 10 according to the present exemplary embodiment, the yaw angular speed realized through steering wheel operation by a driver after a lag time may be predicted according to Equation (6) above, employing lag time τ set so that the value of the ratio of the forward gaze duration T to the lag time τ is in a range from 2.6 to 4.4, and gain k set such that the value of the product thereof with the forward gaze duration T is in a range from 1.9 to 2.2.

The warning control unit 30 compares the yaw angular speed predicted by the yaw angular speed prediction unit 28 with the yaw angular speed after the above lag time detected by the yaw angular speed sensor 18. When the absolute value of the deviation in the yaw angular speeds is a threshold value or above, the warning control unit 30 determines that the detected yaw angular speed has greatly deviated from the yaw angular speed in a normal driving state of a driver, and controls the warning device 20 such that an audible warning is output from the warning device 20.

Figure 4:
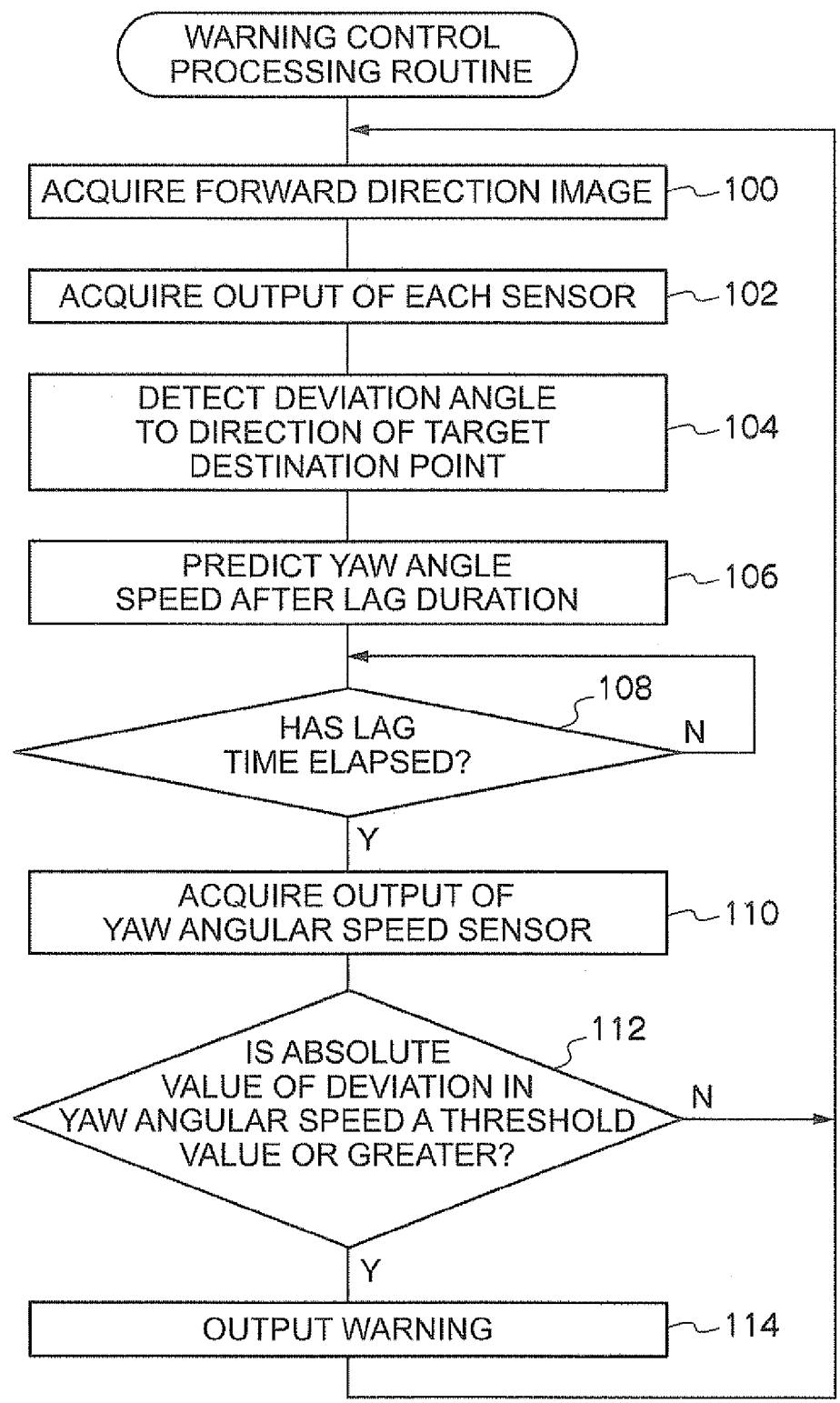
FIG. 4 is a flow chart showing the contents of a warning control processing routine of a driver warning device according to an exemplary embodiment of the present invention.

Explanation will now be given of the operation of the driver warning device 10 according to the present exemplary embodiment. During travel of a vehicle installed with the driver warning device 10, the warning control processing routine shown in FIG. 4 is executed in the computer 22.

First, at step 100, a forward direction image is acquired from the image capture device 12. At step 102, the vehicle speed detected by the vehicle speed sensor 14 and the lateral speed detected by the lateral speed sensor 16 are each acquired.

Then, at step 104, the slip angle is computed from the vehicle speed and lateral speed acquired in step 102 above. Then, the progression direction of the vehicle on the forward direction image is computed from the pre-derived vehicle longitudinal direction, on the forward direction image acquired in step 100 above, and from the computed the slip angle, and the predicted destination point in the progression direction after the forward gaze duration is detected. Then, at step 104, the target destination point on the target course after the forward gaze duration is detected from the forward direction image acquired in step 100 above. Then, the deviation angle is detected between the progression direction of the vehicle and the detected direction of the target destination point after the forward gaze duration.

In the next step 106, the yaw angular speed realized by steering wheel operation by a driver after the lag time is predicted according to Equation (6) above, based on the deviation angle, detected at step 104 above, between the progression direction of the vehicle and the direction of the target destination point.

Then, in step 108, after the processing performed in step 100 and step 102 above, the predicted values of the yaw angular speed during a period of time the same as the above lag time are stored in a memory, and the already stored previous predicted value of the yaw angular speed is output, for the time previous by the equivalent of the lag time in time.

At step 110, the yaw angular speed detected by the yaw angular speed sensor 18 is acquired. Then, at step 112, determination is made as to whether or not the absolute value of the deviation between the yaw angular speed predicted at step 106 above and the yaw angular speed acquired at step 110 above, is a threshold value or greater. When the absolute value of the deviation in yaw angular speeds is less than the threshold value, a warning is not output, and the routine returns to step 100. However, when the absolute value of the deviation in yaw angular speeds is the threshold value or greater, then at step 114, control is made such that an audible warning is output by the warning device 20, and the routine returns to step 100.

Explanation will now be given of results of a comparison between the predicted yaw angular speeds employing the prediction method of the present exemplary embodiment, and actual measured values of yaw angular speeds due to operation by a test subject.

Figure 5:
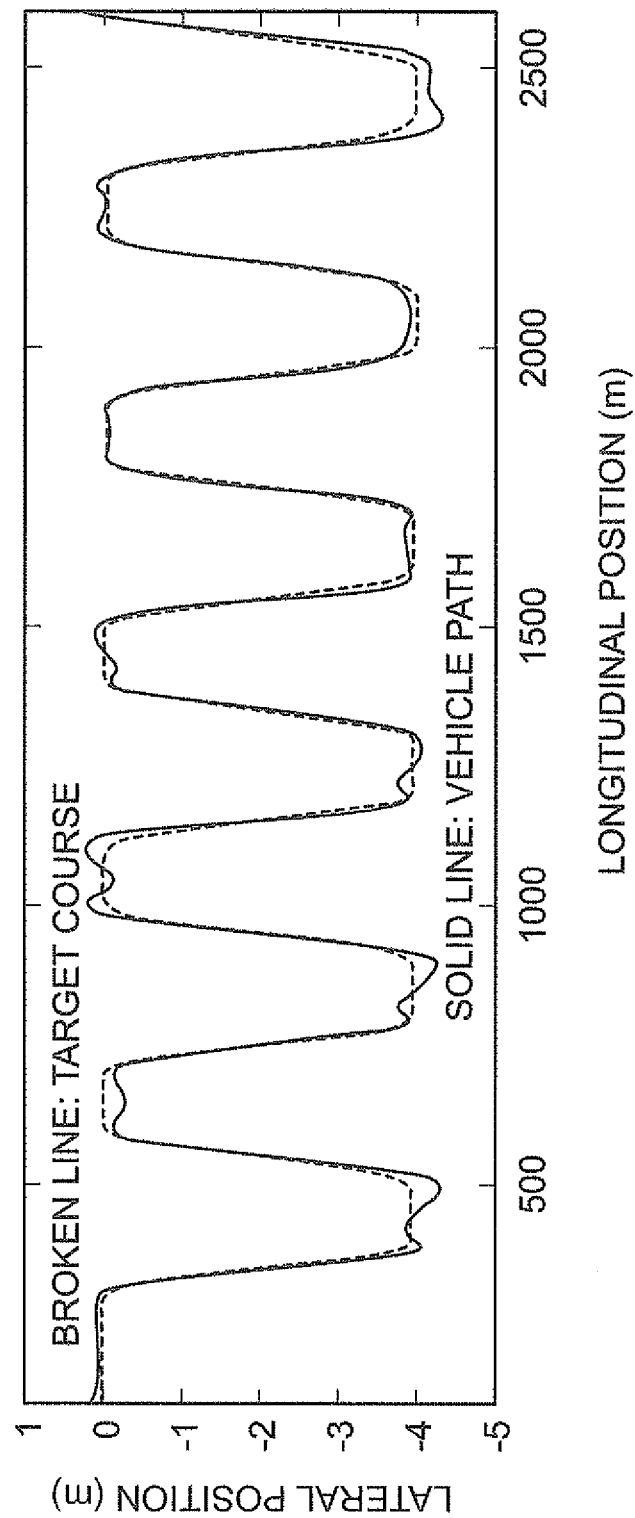
FIG. 5 is a graph showing a target course and a vehicle path due to driver operation by a test subject.

First, explanation will be given regarding test results of operation by a test subject of a driving simulator. A target course was set, as shown in FIG. 5, to smoothly change lanes of width 4 m laterally over 100 m when travelling at a constant 100 km/h, and tests were performed on the operation by the test subject to follow the target course. In FIG. 5, the target course and the vehicle path, as the test results of operation by the test subject, are shown at the same time.

Results obtained were that, although the vehicle path due to driving operation by the test subject substantially followed the target course, there was poor reproducibility relating to errors, such as in the amount of over shoot and the like.

Next, explanation will be given of prediction results by the prediction method of the present exemplary embodiment, in the case of following a target course the same as in the above test. The yaw angular speed was predicted employing the prediction method of the present exemplary embodiment, with the forward gaze duration T set at 1.41 (s), the lag time τ set at T/3 (=0.47 (s)), and the control gain k set at 2/T (=1.42 (1/s)).

Figure 6:
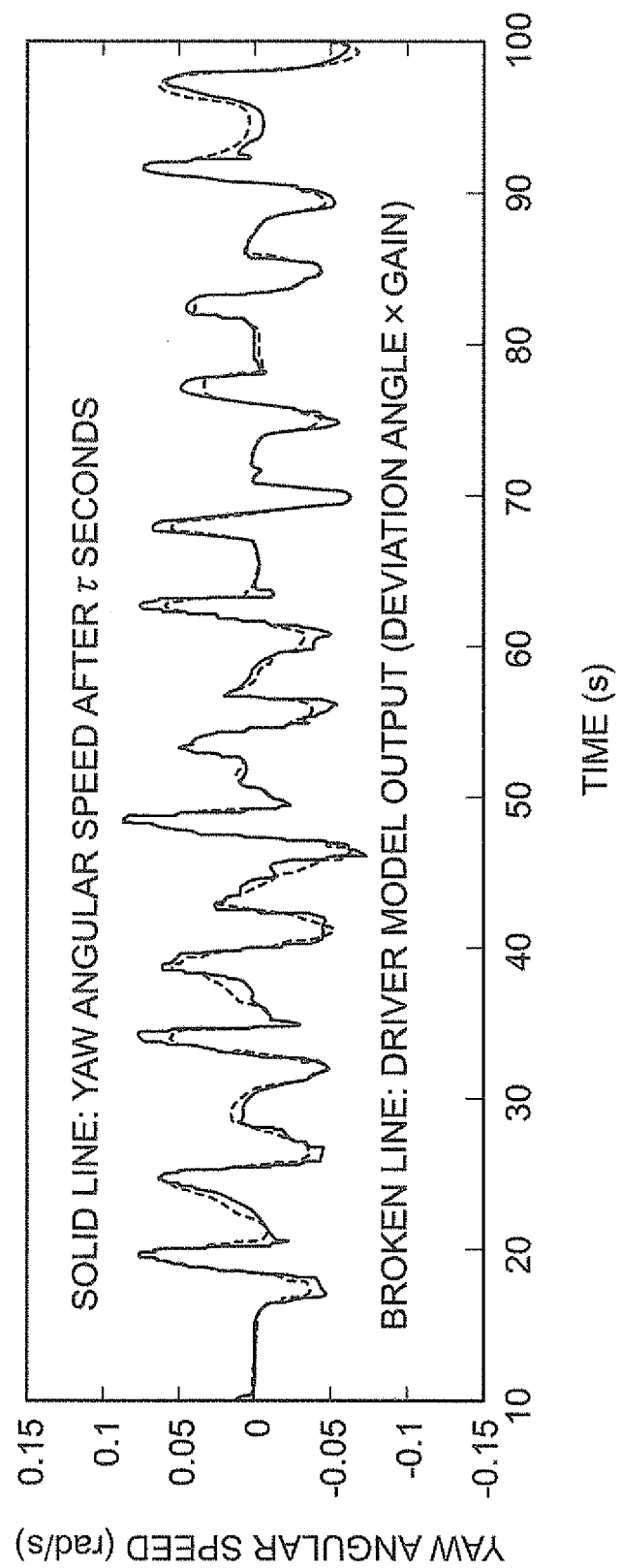
FIG. 6 is a graph showing change in yaw angular speed realized by driver operation by a test subject, and change in yaw angular speed predicted by a driver model.

As shown in FIG. 6, comparison was made of the predicted yaw angular speed against the observed values of the yaw angular speed after τ (s) realized by driving operation by the test subject. The results also had poor reproducibility of time response of yaw angular speed, corresponding in the above test results, to the overshoot amount of the vehicle path having poor reproducibility, as shown in FIG. 5 above. However, notwithstanding this, there was a very high correlation between the predicted value of the yaw angular speed and the observed values (correlation coefficient=0.95), and it can be seen that the vehicle movement during driving operation by the test subject can be predicted with good precision.

As explained above, according to the driver warning device according to the present exemplary embodiment, by delaying the yaw angular speed, proportional to the deviation angle of the direction of the target destination point after the forward gaze duration, by the lag time, and by using the delayed yaw angular speed as the predicted value of yaw angular speed realized by steering wheel operation, the yaw angular speed realized by steering wheel operation by a driver can be predicted with high precision.

Furthermore, a driver model can be configured that does not employ a road surface profile parameter, such as the tangential direction of the target course, the differential value of the yaw angle and the like, for which sufficient precision cannot be expected in detection from a forward direction image.

Furthermore, by employing the predicted yaw angular speed as the yaw angular speed in a normal driving state, and accidents can be prevented by outputting a warning when the observed value of the yaw angular speed deviates greatly from the predicted yaw angular speed.

Lag time in human perception, decision making, and operation is conventionally known, and considered in driver models. However, lag time in perception, decision making, and operation is a biologically occurring duration not related to the forward gaze duration, and has been considered as a useless presence that degrades safety with relation to course following objectives (Theoretical Research on the Stability of the Closed System Composed of Look-ahead Driver and a Planer Vehicle by Takehiko Fujioka, published by the Society of Automotive Engineers of Japan, 20075092, 2007). In contrast to this, in the present exemplary embodiment, lag time has be noticed to be an important parameter for measuring the timing of course following, and it has been discovered that people appropriately change the lag time according to forward gaze duration.

Furthermore, the relationship between the forward gaze duration and the lag time, and the relationship between the forward gaze duration and gain, have been elucidated, and a driver model has been derived that predicts with good precision the vehicle movement realized by steering wheel operation by a driver, using a simple configuration.

It should be noted that while explanation was given above of an example of the exemplary embodiment in which the forward gaze duration was set fixed, there is no limitation thereto. The forward gaze duration may be set according to the driving conditions of a vehicle. The forward gaze duration is something that changes according to the degree of tension of a driver, with this tension being influenced by the difficulty of the course being traveled, the presence of obstacles in the near vicinity and vehicles close in front, and the like. Under course conditions of high tension, a forward gaze duration of about the lower half of the 1 second range is expected, and in course conditions of low tension about 2 seconds is expected. Consequently, a long forward gaze duration may be set for a course with relatively few changes, based on map data, with conditions in which there are no obstacles, vehicles in front, or the like present. However, a short forward gaze duration may be set when travelling on a course with comparatively large changes, and when there are obstacles, vehicles in front, or the like present.

The program of the present invention may be provided stored on a storage medium. Another aspect of the present invention provides a computer-readable medium storing a program causing a computer to execute a process for predicting a yaw angular speed, the process for: detecting a deviation angle between a progression direction of a vehicle, and a direction of a target destination point after a predetermined forward gaze duration on a target course being travelled by the vehicle; and predicting a yaw angular speed proportional to the deviation angle detected by the target destination point deviation angle detection unit, as a yaw angular speed realized by steering wheel operation by a driver after a predetermined lag time for matching a timing of change in vehicle movement to a timing of change in curvature of the target course.

Explanation of the Reference Numerals 10 driver warning device
12 image capture device
14 vehicle speed sensor
18 yaw angular speed sensor
20 warning device
22 computer
26 target destination point deviation angle detection unit
28 yaw angular speed prediction unit
30 warning control unit

The invention claimed is:

1. A driver operation prediction device comprising:
a target destination point deviation angle detection unit that detects a deviation angle between a progression direction of a vehicle, and a direction of a target destination point after a predetermined forward gaze duration on a target course being travelled by the vehicle; and
a yaw angular speed prediction unit that predicts a yaw angular speed proportional to the deviation angle detected by the target destination point deviation angle detection unit, as a yaw angular speed realized by steering wheel operation by a driver after a predetermined lag time for matching a timing of change in vehicle movement to a timing of change in curvature of the target course.

2. The driver operation prediction device of claim 1, wherein the ratio of the forward gaze duration to the lag time is a value between 2.6 and 4.4.

3. The driver operation prediction device of claim 1, wherein a proportionality coefficient of the yaw angular speed to the deviation angle is determined such that the product of the proportionality coefficient and the forward gaze duration is a value between 1.9 and 2.2.

4. The driver operation prediction device of claim 2, wherein a proportionality coefficient of the yaw angular speed to the deviation angle is determined such that the product of the proportionality coefficient and the forward gaze duration is a value between 1.9 and 2.2.

5. The driver operation prediction device of claim 1, further comprising:
   a yaw angular speed detection unit that detects the yaw angular speed of the vehicle; and
   a warning control unit that controls such that a warning is output by an output device when an absolute value of a deviation between the yaw angular speed predicted by the yaw angular speed prediction unit and the yaw angular speed detected after the lag time by the yaw angular speed detection unit is a specific value or greater.

6. The driver operation prediction device of claim 2, further comprising:
   a yaw angular speed detection unit that detects the yaw angular speed of the vehicle; and
   a warning control unit that controls such that a warning is output by an output device when an absolute value of a deviation between the yaw angular speed predicted by the yaw angular speed prediction unit and the yaw angular speed detected after the lag time by the yaw angular speed detection unit is a specific value or greater.

7. The driver operation prediction device of claim 3, further comprising:
   a yaw angular speed detection unit that detects the yaw angular speed of the vehicle; and
   a warning control unit that controls such that a warning is output by an output device when an absolute value of a deviation between the yaw angular speed predicted by the yaw angular speed prediction unit and the yaw angular speed detected after the lag time by the yaw angular speed detection unit is a specific value or greater.

8. The driver operation prediction device of claim 4, further comprising:
   a yaw angular speed detection unit that detects the yaw angular speed of the vehicle; and
   a warning control unit that controls such that a warning is output by an output device when an absolute value of a deviation between the yaw angular speed predicted by the yaw angular speed prediction unit and the yaw angular speed detected after the lag time by the yaw angular speed detection unit is a specific value or greater.

9. The driver operation prediction device of claim 1, wherein the target destination point deviation angle detection unit:
   computes a progression direction of the vehicle on a forward direction image that has been output by an image capture device, based on a vehicle longitudinal direction pre-derived on the forward direction image and on a slip angle of the vehicle;
   detects the target destination position on the forward direction image after the forward gaze duration, based on the progression direction of the vehicle and on a forward gaze distance obtained by the product of the predetermined forward gaze duration and a vehicle speed;
   detects the target destination point after the forward gaze duration on the forward direction image, based on the target course on the forward direction image and on the forward gaze distance obtained by the product of a preset forward gaze duration and the vehicle speed; and
   detects the deviation angle, based on the predicted destination point that has been detected and the position of the target destination point that has been detected.

10. The driver operation prediction device of claim 2, wherein the target destination point deviation angle detection unit:
    computes a progression direction of the vehicle on a forward direction image that has been output by an image capture device, based on a vehicle longitudinal direction pre-derived on the forward direction image and on a slip angle of the vehicle;
    detects the target destination position on the forward direction image after the forward gaze duration, based on the progression direction of the vehicle and on a forward gaze distance obtained by the product of the predetermined forward gaze duration and a vehicle speed;
    detects the target destination point after the forward gaze duration on the forward direction image, based on the target course on the forward direction image and on the forward gaze distance obtained by the product of a preset forward gaze duration and the vehicle speed; and
    detects the deviation angle, based on the predicted destination point that has been detected and the position of the target destination point that has been detected.

11. The driver operation prediction device of claim 3, wherein the target destination point deviation angle detection unit:
    computes a progression direction of the vehicle on a forward direction image that has been output by an image capture device, based on a vehicle longitudinal direction pre-derived on the forward direction image and on a slip angle of the vehicle;
    detects the target destination position on the forward direction image after the forward gaze duration, based on the progression direction of the vehicle and on a forward gaze distance obtained by the product of the predetermined forward gaze duration and a vehicle speed;
    detects the target destination point after the forward gaze duration on the forward direction image, based on the target course on the forward direction image and on the forward gaze distance obtained by the product of a preset forward gaze duration and the vehicle speed; and
    detects the deviation angle, based on the predicted destination point that has been detected and the position of the target destination point that has been detected.

12. The driver operation prediction device of claim 4, wherein the target destination point deviation angle detection unit:
    computes a progression direction of the vehicle on a forward direction image that has been output by an image capture device, based on a vehicle longitudinal direction pre-derived on the forward direction image and on a slip angle of the vehicle;
    detects the target destination position on the forward direction image after the forward gaze duration, based on the progression direction of the vehicle and on a forward gaze distance obtained by the product of the predetermined forward gaze duration and a vehicle speed;
    detects the target destination point after the forward gaze duration on the forward direction image, based on the target course on the forward direction image and on the forward gaze distance obtained by the product of a preset forward gaze duration and the vehicle speed; and
    detects the deviation angle, based on the predicted destination point that has been detected and the position of the target destination point that has been detected.

13. The driver operation prediction device of claim 5, wherein the target destination point deviation angle detection unit:
    computes a progression direction of the vehicle on a forward direction image that has been output by an image capture device, based on a vehicle longitudinal direction pre-derived on the forward direction image and on a slip angle of the vehicle;

detects the target destination position on the forward direction image after the forward gaze duration, based on the progression direction of the vehicle and on a forward gaze distance obtained by the product of the predetermined forward gaze duration and a vehicle speed;

detects the target destination point after the forward gaze duration on the forward direction image, based on the target course on the forward direction image and on the forward gaze distance obtained by the product of a preset forward gaze duration and the vehicle speed; and detects the deviation angle, based on the predicted destination point that has been detected and the position of the target destination point that has been detected.

14. The driver operation prediction device of claim 6, wherein the target destination point deviation angle detection unit:

computes a progression direction of the vehicle on a forward direction image that has been output by an image capture device, based on a vehicle longitudinal direction pre-derived on the forward direction image and on a slip angle of the vehicle;

detects the target destination position on the forward direction image after the forward gaze duration, based on the progression direction of the vehicle and on a forward gaze distance obtained by the product of the predetermined forward gaze duration and a vehicle speed;

detects the target destination point after the forward gaze duration on the forward direction image, based on the target course on the forward direction image and on the forward gaze distance obtained by the product of a preset forward gaze duration and the vehicle speed; and detects the deviation angle, based on the predicted destination point that has been detected and the position of the target destination point that has been detected.

15. The driver operation prediction device of claim 7, wherein the target destination point deviation angle detection unit:

computes a progression direction of the vehicle on a forward direction image that has been output by an image capture device, based on a vehicle longitudinal direction pre-derived on the forward direction image and on a slip angle of the vehicle;

detects the target destination position on the forward direction image after the forward gaze duration, based on the progression direction of the vehicle and on a forward gaze distance obtained by the product of the predetermined forward gaze duration and a vehicle speed;

detects the target destination point after the forward gaze duration on the forward direction image, based on the target course on the forward direction image and on the forward gaze distance obtained by the product of a preset forward gaze duration and the vehicle speed; and detects the deviation angle, based on the predicted destination point that has been detected and the position of the target destination point that has been detected.

16. The driver operation prediction device of claim 8, wherein the target destination point deviation angle detection unit:

computes a progression direction of the vehicle on a forward direction image that has been output by an image capture device, based on a vehicle longitudinal direction pre-derived on the forward direction image and on a slip angle of the vehicle;

detects the target destination position on the forward direction image after the forward gaze duration, based on the progression direction of the vehicle and on a forward gaze distance obtained by the product of the predetermined forward gaze duration and a vehicle speed;

detects the target destination point after the forward gaze duration on the forward direction image, based on the target course on the forward direction image and on the forward gaze distance obtained by the product of a preset forward gaze duration and the vehicle speed; and detects the deviation angle, based on the predicted destination point that has been detected and the position of the target destination point that has been detected.

17. A recording medium storing a program that causes a computer to function as:

a target destination point deviation angle detection unit that detects a deviation angle between a progression direction of a vehicle, and a direction of a target destination point after a predetermined forward gaze duration on a target course being travelled by the vehicle; and a yaw angular speed prediction unit that predicts a yaw angular speed proportional to the deviation angle detected by the target destination point deviation angle detection unit, as a yaw angular speed realized by steering wheel operation by a driver after a predetermined lag time for matching a timing of change in vehicle movement to a timing of change in curvature of the target course.

18. A driver operation prediction method comprising:

detecting a deviation angle between a progression direction of a vehicle, and a direction of a target destination point after a predetermined forward gaze duration on a target course being travelled by the vehicle; and predicting a yaw angular speed proportional to the detected deviation angle, as a yaw angular speed realized by steering wheel operation by a driver after a predetermined lag time for matching a timing of change in vehicle movement to a timing of change in curvature of the target course.

* * * * *